(12) United States Patent
Schimmer et al.

(10) Patent No.: US 12,025,532 B2
(45) Date of Patent: Jul. 2, 2024

(54) DEVICE FOR MONITORING A SHAFT COUPLING COUPLING A FIRST SHAFT TO A SECOND SHAFT

(71) Applicant: Siemens Aktiengesellschaft, Munich (DE)

(72) Inventors: Jürgen Schimmer, Nuremberg (DE); Christoph Nolting, Höchstadt/Aisch (DE); Dirk Scheibner, Nuremberg (DE); Jürgen Zettner, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/272,517

(22) PCT Filed: Oct. 21, 2021

(86) PCT No.: PCT/EP2021/079243
§ 371 (c)(1),
(2) Date: Jul. 14, 2023

(87) PCT Pub. No.: WO2022/152415
PCT Pub. Date: Jul. 21, 2022

(65) Prior Publication Data
US 2023/0408372 A1    Dec. 21, 2023

(30) Foreign Application Priority Data
Jan. 15, 2021   (EP) .................................. 21151797

(51) Int. Cl.
*G01M 13/022*    (2019.01)
*F16D 9/06*      (2006.01)
(Continued)

(52) U.S. Cl.
CPC ............. *G01M 13/022* (2013.01); *F16D 9/06* (2013.01); *H02K 7/003* (2013.01); *F16D 9/08* (2013.01); *F16D 9/10* (2013.01)

(58) Field of Classification Search
CPC .......... G01M 13/022; F16D 9/06; F16D 9/08; F16D 9/10; H02K 7/003
See application file for complete search history.

(56) References Cited

U.S. PATENT DOCUMENTS

2003/0016351 A1   1/2003 Gomelskiy
2007/0078622 A1*  4/2007 Sue ........................... G01L 3/12
                                               702/151
(Continued)

FOREIGN PATENT DOCUMENTS

CN    103 889 136 A    6/2014

OTHER PUBLICATIONS

PCT International Search Report and Written Opinion of International Searching Authority dated Feb. 18, 2021 corresponding to PCT International Application No. PCT/EP2021/079243 filed Oct. 21, 2021.

*Primary Examiner* — Paul M. West
(74) *Attorney, Agent, or Firm* — Henry M. Feiereisen LLC

(57) ABSTRACT

A device for monitoring a shaft coupling coupling a first shaft to a second shaft includes an optical unit comprising a receiving element which is designed to receive an electromagnetic radiation in a form of light, and an error notification element designed for arrangement on and/or within the first shaft and on and/or within the second shaft. The error notification element is designed to notify when the first shaft runs asynchronously with respect to the second shaft.

18 Claims, 4 Drawing Sheets

(51) Int. Cl.
*H02K 7/00* (2006.01)
*F16D 9/08* (2006.01)
*F16D 9/10* (2006.01)

(56) References Cited

U.S. PATENT DOCUMENTS

| | | | |
|---|---|---|---|
| 2009/0230825 A1* | 9/2009 | Braun | H02K 7/003 |
| | | | 464/104 |
| 2009/0277289 A1* | 11/2009 | Schwesig | G05B 9/02 |
| | | | 73/1.01 |
| 2019/0211749 A1 | 7/2019 | Rodrigues | |
| 2021/0199475 A1* | 7/2021 | Dantler | G01D 5/34792 |

* cited by examiner

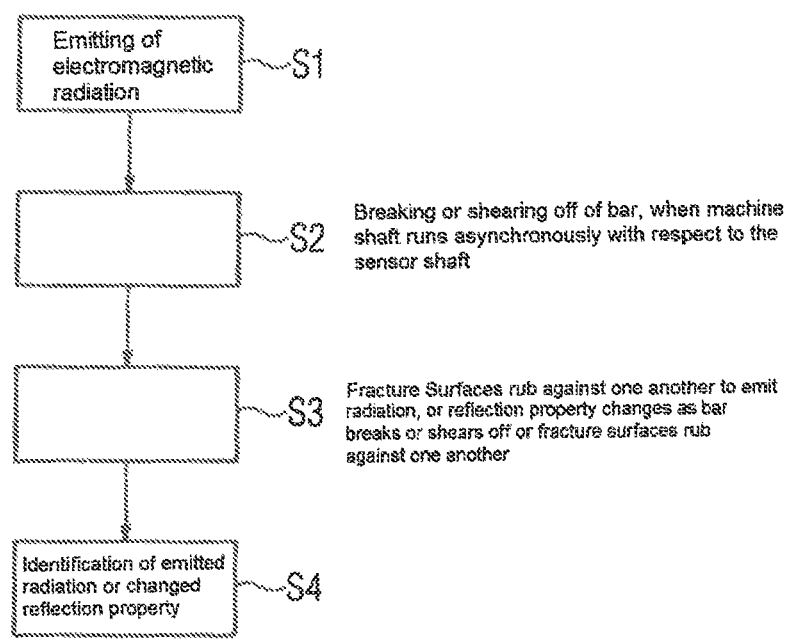

DEVICE FOR MONITORING A SHAFT COUPLING COUPLING A FIRST SHAFT TO A SECOND SHAFT

CROSS-REFERENCES TO RELATED APPLICATIONS

This application is the U.S. National Stage of International Application No. PCT/EP202/1079243, filed Oct. 21, 2021, which designated the United States and has been published as International Publication No, WO 2022/152415 A1 and which claims the priority of European Patent Application, Serial No. 21151797.4, filed Jan. 25, 2021, pursuant to 35 U.S.C. 119(a)-(d).

BACKGROUND OF THE INVENTION

The invention relates to a device for monitoring a shaft coupling coupling a first shaft to a second shaft.

Shaft couplings are critical components in drivetrains, which can be damaged in the case of overload, for instance.

A defective connection between a sensor and a motor is particularly safety-critical, for instance, since a faulty reference signal may exist for a controller and it is thus not possible to ensure safe operation of the motor. Moreover, with damage of this type, it is no longer possible to adhere to precise speed specifications.

In order to avoid damage to shaft couplings, in most cases individual or all components of the shaft coupling are overdimensioned. This is very cost-intensive, however.

The object underlying the invention is to improve this.

SUMMARY OF THE INVENTION

The object is achieved by a device for monitoring a shaft coupling coupling a first shaft to a second shaft, having:
  an optical unit with a receiving element, embodied to receive electromagnetic radiation, in particular light,
  an error notification element, wherein the error notification element can be arranged on and/or within the first shaft and on and/or within the second shaft,
  wherein the error notification element is embodied to notify an asynchronous running of the first shaft with respect to the second shaft.

The invention is suitable for different shaft couplings, e.g. for a shaft coupling which couples a machine shaft to a load, and for a shaft coupling which couples a sensor shaft to a machine shaft.

The invention can be applied in particular for servomotor actuators. Servomotor actuators are designed for work tasks which require high precision. Knowledge about an integrity of a shaft coupling is particularly advantageous herefor.

Electromagnetic radiation in the form of light is particularly suitable for the invention, as described below. Light is generally understood to mean the visible part of the electromagnetic spectrum in the range of 380 nm to 780 nm. Invisible regions of electromagnetic radiation can also be used for the invention, in particular infrared light or ultraviolet light.

One embodiment is advantageous, according to which a front axial end of the error notification element can be fastened to the first shaft, wherein a rear axial end can be fastened to the second shaft.

This is advantageous in that it is also possible to retrofit existing machines.

Fastening can be achieved by means of adhesive and/or screws, for instance.

One embodiment is advantageous, according to which the error notification element is embodied so that this can shear off or break off if the first shaft runs asynchronously with respect to the second shaft.

This is achieved particularly advantageously by means of a predetermined breaking point.

A predetermined breaking point is not essential, however. The error notification element can also have a material which breaks in the case of asynchrony between the shafts.

However, the error notification element can also notify of the error (i.e. asynchronous running) in another way. E.g. the error notification element may bend and/or twist in the case of asynchrony. Other modifications are also possible.

The shaft or shafts are designed advantageously as a hollow shaft. The error notification element is advantageously dimensioned such that the error notification element can be arranged within the hollow shaft.

An exemplary diameter of the error notification element lies between 1 mm and 20 mm, advantageously 5 mm and 10 cm.

One embodiment is advantageous, according to the which the error notification element is embodied so that a first fracture surface of a first part of the error notification element arising as a result of shearing-off and/or breaking-off and a second fracture surface of a second part of the error notification element arising as a result of shearing-off and/or breaking-off during operation of the first shaft and second shaft rub against one another so that radiation, preferably light, can be emitted in particular by means of triboluminescence.

The term triboluminescence describes the occurrence of a light emission, in particular a cold light emission, with mechanical stress on solid particles. The term is in most cases understood more broadly and the luminescence also forms part of this, for instance.

With the luminescence, a physical system is moved into an excited state by energy supplied from the outside and, upon transition into its basic state, emits light (including radiation outside of the visible range) by emitting photons.

The invention is suitable both for an emission of radiation, preferably light, by means of luminescence and by means of triboluminescence.

The following effects are moreover included in the invention:

An emission of radiation on the basis of fluorescence, when no activation process takes place between an absorption of energy and the emission.

An emission of radiation on the basis of phosphorescence, when an excited intermediate state can freeze the energy for a specific time.

One embodiment is advantageous, according to which the error notification element has plastic.

One embodiment is advantageous, according to which the error notification element has polytetrafluoroethylene (PTFE) and/or polydimethylsiloxane (PDMS).

One embodiment is advantageous, according to which the error notification element has ZnS:Cu+PTFE.

One embodiment is advantageous, according to which the error notification element has ZnS:Cu+PDMS+PTFE.

One embodiment is advantageous, according to which the error notification element has ZnS:Cu+PDMS.

ZnS:Cu is copper-doped zinc sulfide here.

An embedding into a plastic film is advantageous.

An elastic, hybrid two-layer luminescent composite material based on the combination of strain-induced and triboelectricaily induced electroluminescence is particularly suitable.

One embodiment is advantageous, according to which the error notification element has a reflection element, in particular a mirror.

The reflection element is arranged advantageously at least substantially in the region of an axial end of the error notification element. Other arrangements are also conceivable.

One embodiment is advantageous, according to which the device has an emission element. The emission element is preferably embodied as a light-emitting diode.

A light-emitting diode is advantageous since it is inexpensive and robust.

One embodiment is advantageous, according to which the receiving element is embodied as a photodiode.

A photodiode is advantageous since it is inexpensive and robust.

It is also possible, however, for the receiving element to be a photodetector. Other forms are also possible.

One embodiment is advantageous, according to which the receiving element is embodied for receiving the emitted radiation or reflected radiation.

One embodiment is advantageous, according to which the receiving element is embodied for detecting a change in the reflection properties.

Reflection properties advantageously relate to a light reflection of ambient light and/or diffusely reflected light and/or specularly reflected light.

The object presented above is further achieved by a shaft coupling, having a device of this type.

The object presented above is further achieved by a dynamoeiectric rotary machine having: a first shaft; a second shaft, wherein the first shaft and the second shaft are coupled by means of a shaft coupling; and a device of this type.

One embodiment is advantageous, according to which the first shaft and/or the second shaft is embodied as a hollow shaft.

An asynchronous running, in particular an asynchronous running which not only lasts for a short period of time, is in most cases an indication of a fault. Damage to the shaft coupling can be identified as a result.

The invention is advantageous in that a cost-intensive overdimensioning of in particular sensor coupling, sensor shaft and sensor bearing is no longer required.

By means of the invention it is possible to identify couplings damaged or destroyed as a result of overload, for instance.

In particular, the invention is particularly suitable for servomotor actuators. Servomotor actuators often have sensors with integral bearings. In this regard the sensor shaft is connected to the machine shaft by way of a coupling. In the case of bearing damage to the sensor bearings, these become sluggish and the sensor coupling is more heavily loaded. This may result in destruction. However, the invention offers the advantage that this can be identified.

BRIEF DESCRIPTION OF THE DRAWING

The invention is described and explained in greater detail below on the basis of the exemplary embodiments represented in the figures. In the drawings:

FIG. 4 shows a method.

DETAILED DESCRIPTION OF PREFERRED EMBODIMENTS

Figure 1:
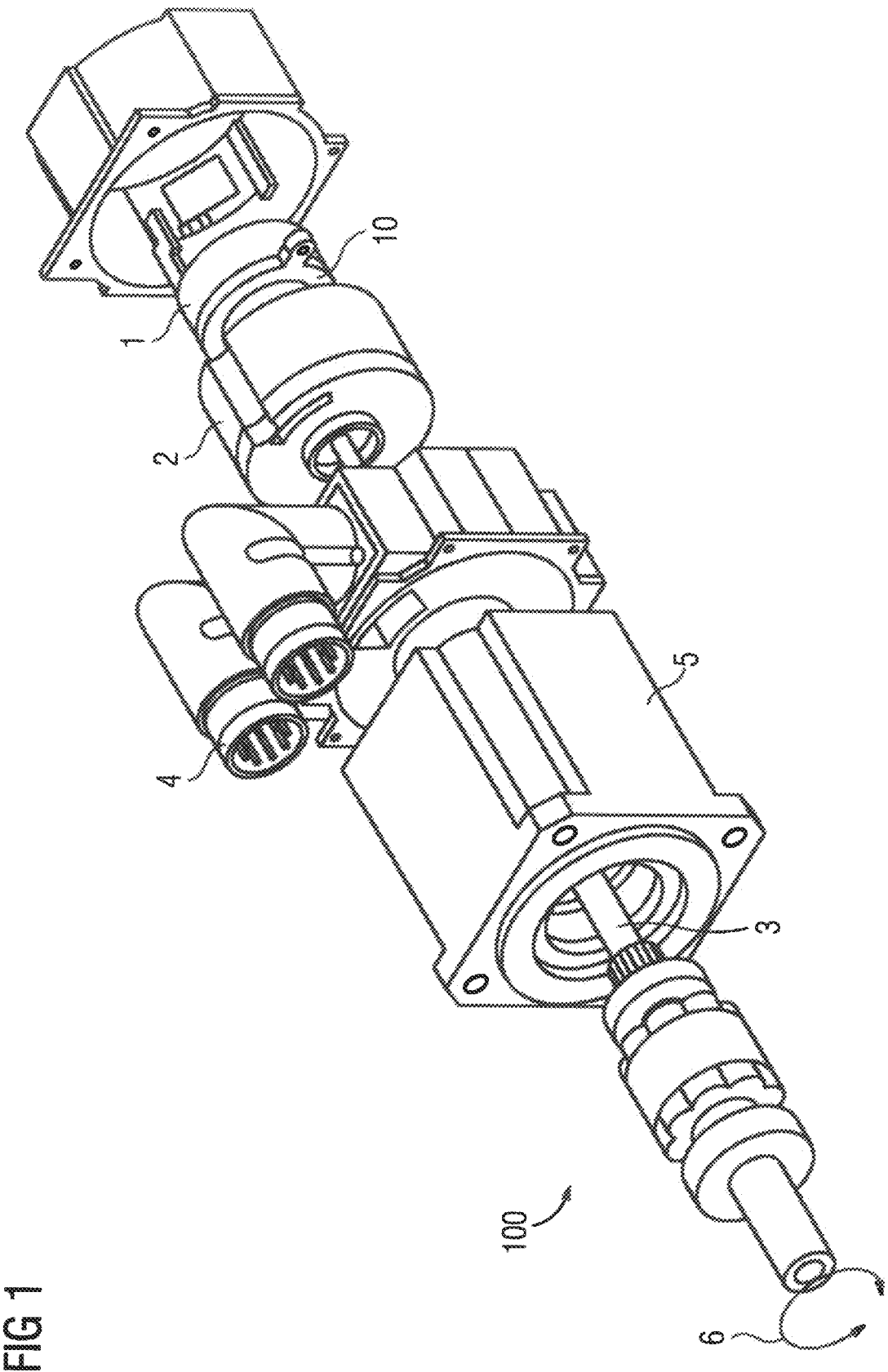
FIG. 1 shows an exploded view of an exemplary servomotor actuator.

FIG. 1 shows an exploded view of an exemplary servomotor actuator 100. The servomotor actuator has a sensor 1, a brake 2, a shaft 3, a connecting device 4 and an active part 5.

FIG. 1 further shows a rotation direction 6.

The FIG. 1 also shows a device 10 for monitoring a shaft coupling coupling a first shaft and a second shaft. The device 10 is described in more detail in the following figures. The device 10 can be used to monitor a shaft coupling, which couples a sensor shaft to a machine shaft (as shown in the figure). Furthermore, it is conceivable for the device 10 to be arranged for the purpose of monitoring a coupling of the machine shaft with a load. The device 10 is also suitable for other shaft couplings.

Figure 2:
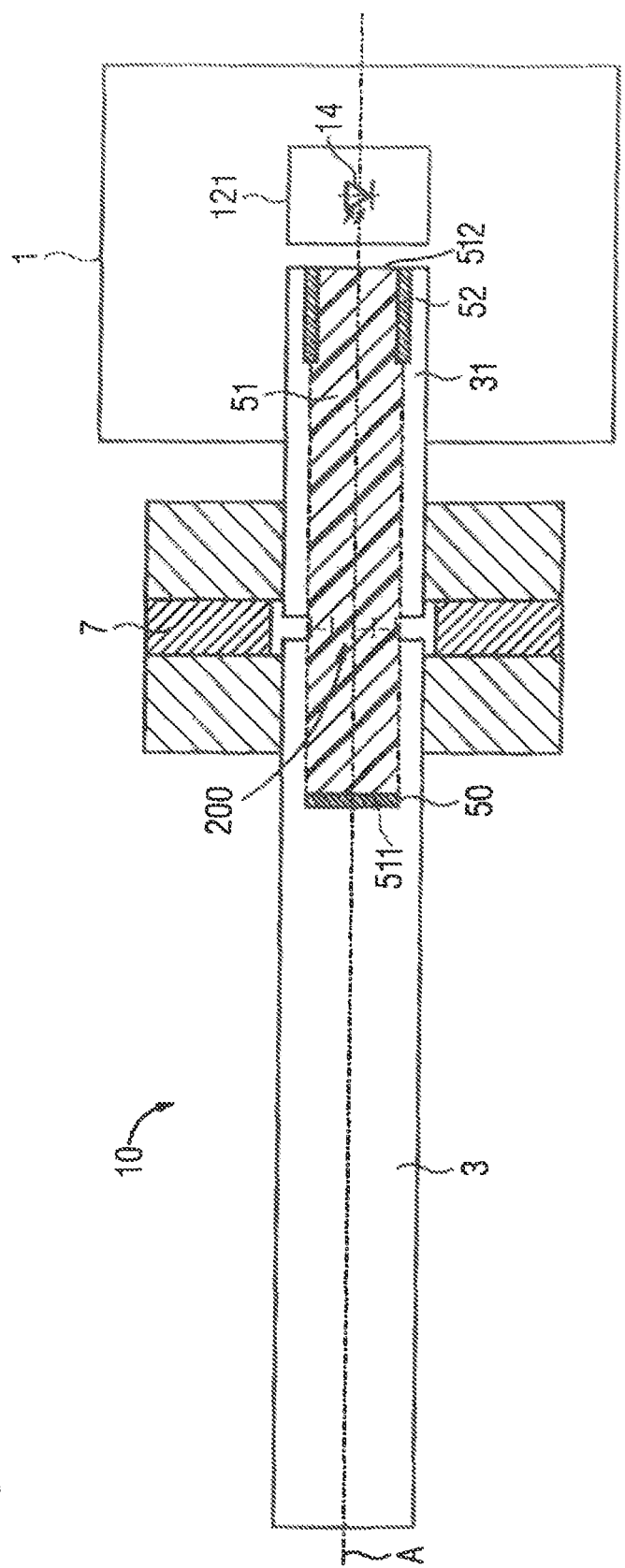
FIG. 2 shows a possible embodiment of the device for monitoring a shaft coupling coupling a first shaft to a second shaft.

FIG. 2 shows a possible embodiment of the device 10 for monitoring a shaft coupling coupling a first shaft to a second shaft.

In FIG. 2. the first shaft is a machine shaft 3. In FIG. 2, the second shaft is a sensor shaft 31. FIG. 2 moreover shows that the machine shaft 3 and the sensor shaft 3 are coupled by means of a coupling 7 (also: shaft coupling).

FIG. 2 additionally shows an axis of rotation A.

The device 10 comprises an optical unit 121 with a receiving element, embodied for receiving an electromagnetic radiation, in particular light. In FIG. 2, this is a photodiode 14. Other receiving elements are also conceivable.

In the embodiment shown in FIG. 2, the optical unit 121 does not comprise any emission element.

In FIG. 2, the optical unit 121 is arranged in or on the sensor 1.

The device 10 comprises a bar 51. In FIG. 2, the bar 51 is fastened within the machine shaft 3 embodied as a hollow shaft by means of a first fastening 50.

The bar 51 is moreover fastened within the sensor shaft 31 embodied as a hollow shaft with a second fastening 52.

It is also possible to fasten the bar 51 at another point, e.g. at an external periphery of the shaft 3 or 31.

FIG. 2 shows a front axial end 511 and a rear axial end 512 of the bar 51.

The bar is advantageously embodied so that it can shear off or break off if the machine shaft 3 runs asynchronously with respect to the sensor shaft 31.

A first fracture surface, in particular a machine shaft-side fracture surface, of a first part of the bar arising as a result of shearing-off and/or breaking-off and a second fracture surface, in particular a sensor shaft-side fracture surface, of a second part of the bar arising as a result of shearing-off and/or breaking-off during operation of the machine shaft 3 and sensor shaft 31 advantageously rub against one another so that radiation, preferably light, can be emitted in particular by means of triboluminescence.

The photodiode 14 detects this and can transmit this information to a control unit of the servomotor actuator (not shown), for instance.

The bar 51 advantageously has plastic, e.g. PTFE.

The bar 51 can be glued into the shaft 3 or 31 embodied as a hollow shaft, for instance, or glued onto the outer periphery of the shaft 3 or 31.

Injection is also conceivable.

The material of the bar 51 is advantageously transparent, in particular transparent plastic.

A transparent material is advantageous, on account of the optical active principle, so that an optical signal can be transmitted optimally through the bar.

If the connection between the sensor shaft 31 and machine shaft 3 established by means of the coupling 7 is lost, the bar 51 shears off or breaks off.

To this end, the bar 51 can have a predetermined breaking point 200.

The breaking of the bar 51 or the friction of the fracture surfaces can be evaluated by means of the photodiode 14 by measuring triboluminescent effects.

A distance of a few centimeters, e.g. 1 cm to 50 cm, is advantageous between the optical unit 121, which is advantageously arranged on the sensor side, and the fastening 50.

In the case of very large machines, it is also possible, however, for a distance to extend over several meters, e.g. 1 to 10 m.

Figure 3:
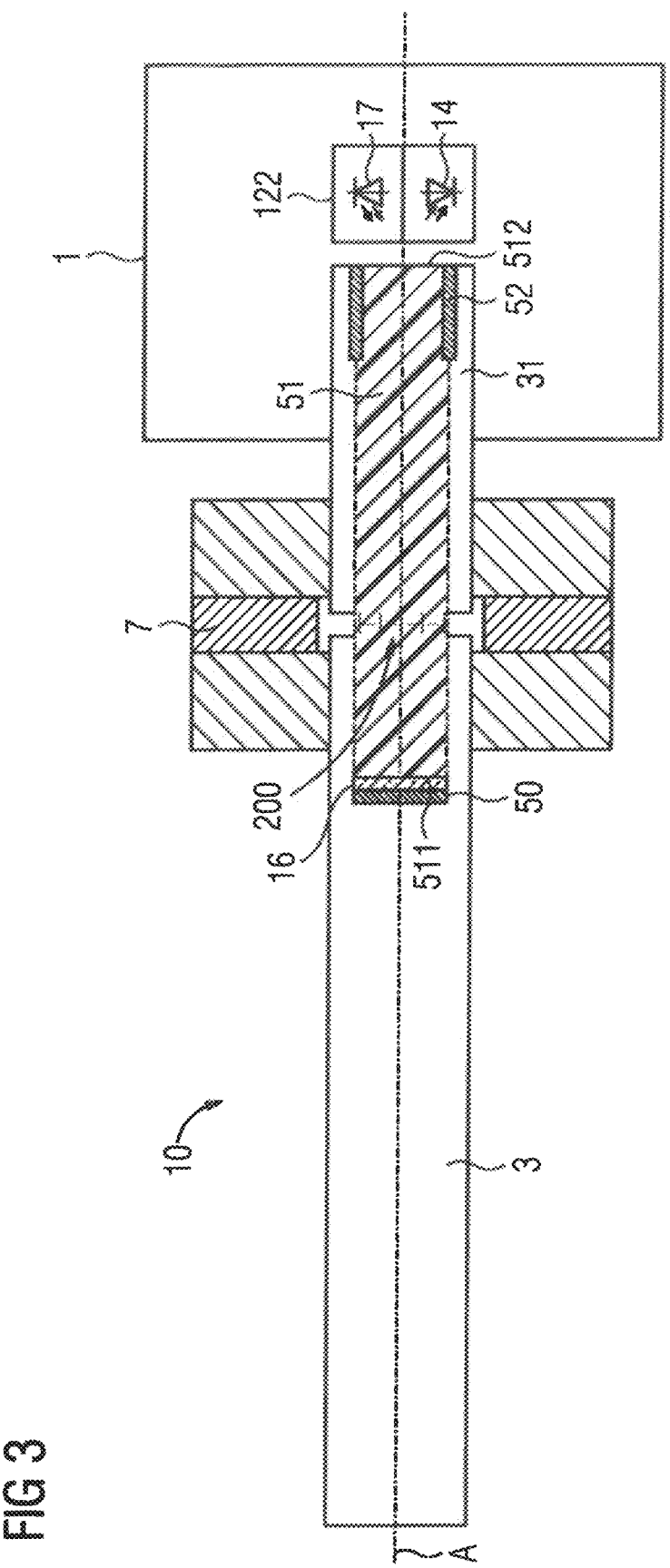
FIG. 3 shows a further possible embodiment of the device for monitoring a shaft coupling coupling a first shaft to a second shaft.

FIG. 3 shows a further possible embodiment of the device 10 for monitoring a shaft coupling coupling a first shaft to a second shaft.

Instead of the triboluminescence described in FIG. 2, changed reflection properties of the broken bar 51 can also be evaluated.

An additional illumination is useful here.

This is achieved by an optical unit 122, which has an emission element in the form of a light-emitting diode 17. Other emission elements are also conceivable. It is moreover also conceivable for lighting conditions prevailing at the place of installation of the device 10 to be adequate as lighting.

FIG. 3 shows the sensor shaft 31 coupled to the machine shaft 3. The shafts 3 and 31 are embodied as a hollow shaft in the figure. The bar 51 is located therein.

There is lighting on the sensor side and advantageously a reflection on a mirror 16, which is arranged on the machine shaft side. The brightness is detected with the photodiode 14 which is arranged on the sensor side.

The described arrangement of the components is preferred. However, it is also possible to arrange the optical unit 121 or 122 at the axial end of the machine shaft 3 and to replace the other components analogously.

A distance of a few centimeters, e.g. 1 cm to 50 cm, is advantageous between the optical unit 122, which is advantageously arranged on the sensor side, and the mirror 16.

In the case of very large machines, it is also possible, however, for a distance to extend over several meters, e.g. 1 to 10 m.

The invention is advantageous in that a damaged coupling can be identified reliably and in a cost-effective manner.

FIG. 4 shows a method.

In an optional method step S1, the emission element emits electromagnetic radiation, in particular light.

In a method step S2, the machine shaft runs asynchronously with respect to the sensor shaft, whereupon the bar breaks or shears off.

In a method step S3, for the embodiment of the device described in FIG. 2, the following occurs: The fracture surfaces rub against one another so that radiation, preferably light, is emitted in particular by means of triboluminescence.

In the method step S3, for the embodiment of the device described in FIG. 3, the following occurs: The reflection properties change as a result of the breaking or shearing-off of the bar and/or as a result of the fracture surfaces rubbing against one another. This is because, in this embodiment, the emitted radiation (see S1) is advantageously reflected by the mirror.

In a method step S4, the emitted radiation or the changed reflection property is identified by the photodiode.

The invention claimed is:

1. A device for monitoring a shaft coupling coupling a first shaft to a second shaft, the device comprising:
    an optical unit comprising a receiving element which is designed to receive an electromagnetic radiation in a form of light; and
    an error notification element designed for arrangement on and/or within the first shaft and on and/or within the second shaft, said error notification element designed such as to shear off or break off when the first shaft runs asynchronously with respect to the second shaft.

2. The device of claim 1, wherein the error notification element includes a front axial end fastenabie to the first shaft, and a rear axial end fastenable to the second shaft.

3. The device of claim 1, wherein the error notification element is designed such that a first fracture surface of a first part of the error notification element arising as a result of shearing-off and/or breaking-off and a second fracture surface of a second part of the error notification element arising as a result of shearing-off and/or breaking-off rub against one another during operation of the first shaft and second shaft so that the electromagnetic radiation is capable of being emitted in particular by triboluminescence.

4. The device of claim 1, wherein the error notification element includes plastic.

5. The device of claim 1, wherein the error notification element includes polytetrafluorethylene and/or polydimethylsiloxane.

6. The device of claim 1, wherein the error notification element includes a predetermined breaking point.

7. The device of claim 1, wherein the error notification element comprises a reflection element.

8. The device of claim 7, wherein the reflection element is a mirror.

9. The device of claim 1, further comprising an emission element designed to emit the electromagnetic radiation.

10. The device of claim 9, wherein the emission element is a light-emitting diode.

11. The device of claim 1, wherein the receiving element is a photodiode.

12. The device of claim 1, wherein the receiving element is designed to receive emitted electromagnetic radiation or reflected electromagnetic radiation.

13. The device of claim 1, wherein the receiving element is designed to detect a change in reflection properties.

14. A shaft coupling for coupling a first shaft to a second shaft, the shaft coupling comprising a device, said device comprising an optical unit comprising a receiving element which is designed to receive an electromagnetic radiation in the form of light, and an error notification element designed for arrangement on and/or within the first shaft and on and/or within the second shaft, said error notification element designed such as to shear off or break off when the first shaft runs asynchronously with respect to the second shaft.

15. The shaft coupling of claim 14, wherein the error notification element includes a front axial end fastenable to the first shaft, and a rear axial end fastenable to the second shaft.

16. The shaft coupling of claim 14, wherein the error notification element is designed such that a first fracture surface of a first part of the error notification element arising as a result of shearing-off and/or breaking-off and a second fracture surface of a second part of the error notification element arising as a result of shearing-off and/or breaking-off rub against one another during operation of the first shaft and second shaft so that the electromagnetic radiation is capable of being emitted in particular by triboluminescence.

17. A dynamoelectric rotary machine, comprising:
a first shaft,
a second shaft;
a shaft coupling designed to couple the first shaft and the second shaft; and
a device for monitoring the shaft coupling, said device comprising an optical unit comprising a receiving element which is designed to receive an electromagnetic radiation in the form of light, and an error notification element designed for arrangement on and/or within the first shaft and on and/or within the second shaft, said error notification element designed to shear off or break off when the first shaft runs asynchronously with respect to the second shaft.

18. The dynamo-electric rotary machine of claim 17, wherein at least one of the first shaft and the second shaft is a hollow shaft.

\* \* \* \* \*